(12) United States Patent
Nojima et al.

(10) Patent No.: US 6,864,879 B2
(45) Date of Patent: Mar. 8, 2005

(54) ROTATIONAL OPERATION MECHANISM AND MUSIC PLAYBACK APPARATUS USING THE MECHANISM

(75) Inventors: Yoshitaka Nojima, Tokorozawa (JP); Kenji Muratani, Tokorozawa (JP)

(73) Assignee: Pioneer Corporation, Tokyo-to (JP)

( * ) Notice: Subject to any disclaimer, the term of this patent is extended or adjusted under 35 U.S.C. 154(b) by 240 days.

(21) Appl. No.: 10/146,439

(22) Filed: May 16, 2002

(65) Prior Publication Data

US 2002/0171626 A1 Nov. 21, 2002

(30) Foreign Application Priority Data

May 17, 2001 (JP) ........................................ 2001-148442

(51) Int. Cl.[7] ................................................. G09G 5/08
(52) U.S. Cl. ........................ 345/156; 345/723; 345/727; 360/73.08
(58) Field of Search ................................ 345/156, 723, 345/727, 473, 161; 360/73.08, 137; 200/4; 341/20; 386/81, 52

(56) References Cited

U.S. PATENT DOCUMENTS

| | | | | |
|---|---|---|---|---|
| 4,786,982 A | * | 11/1988 | Wakahara et al. | 386/81 |
| 5,187,630 A | * | 2/1993 | MacKay et al. | 360/137 |
| 5,351,161 A | * | 9/1994 | MacKay et al. | 360/137 |
| 5,790,769 A | * | 8/1998 | Buxton et al. | 345/473 |
| 5,877,463 A | * | 3/1999 | Choi | 200/4 |
| 5,903,229 A | * | 5/1999 | Kishi | 341/20 |
| 5,986,844 A | * | 11/1999 | Inomata et al. | 360/73.08 |
| 6,191,784 B1 | * | 2/2001 | Buxton et al. | 345/723 |
| 6,310,606 B1 | * | 10/2001 | Armstrong | 345/161 |
| 6,525,277 B2 | * | 2/2003 | Oba et al. | 200/4 |
| 6,608,965 B1 | * | 8/2003 | Tobimatsu et al. | 386/52 |

FOREIGN PATENT DOCUMENTS

| | | |
|---|---|---|
| EP | 0 575 619 A1 | 12/1993 |
| EP | 1 081 694 A1 | 3/2001 |
| JP | 10 199126 A | 7/1998 |
| JP | 10 208375 A | 8/1998 |
| JP | 10 326454 | 12/1998 |
| JP | 2000 048474 A | 2/2000 |
| JP | 2000 050565 A | 2/2000 |
| JP | 2001 043664 A | 2/2001 |
| WO | WO 97/01168 | 1/1997 |
| WO | WO 00/21090 | 4/2000 |

* cited by examiner

Primary Examiner—Dennis-Doon Chow
Assistant Examiner—Srilakshmi K. Kumar
(74) Attorney, Agent, or Firm—Nixon & Vanderhye, PC (57) ABSTRACT

A rotational operation mechanism for a DJ apparatus enables smooth rotation to be achieved using a simple configuration. A rotational operation mechanism has a base, a display window member fixed onto the base, a ring member positioned on the display window member and holding a plurality of rotatable balls, and a rotation operation portion positioned on the ring member and operated by an operator. Mutually facing surfaces of the display window member and the rotation operation portion are provided with grooves that have substantially the same diameter as the ring member. The ring member is sandwiched between the display window member and the rotation operation portion such that the plurality of balls are received in the groove of the display window member and the groove of the rotation operation portion, and the ring member is rotatable in a peripheral direction. One of the rotation operation portion and the base is provided with magnets and the other of the rotation operation portion, and the base is provided with metal portions at positions facing the magnets.

25 Claims, 6 Drawing Sheets

ROTATIONAL OPERATION MECHANISM AND MUSIC PLAYBACK APPARATUS USING THE MECHANISM

BACKGROUND OF THE INVENTION

1. Field of the Invention

The present invention relates to a rotational operation mechanism that performs a rotation movement in response to the operation of a user, and more particularly relates to a rotational operation mechanism that can be preferably employed as a portion of what is known as a disc jockey (DJ) apparatus.

2. Description of the Related Art

In what is known as a DJ apparatus, a disc such as a compact disc (CD) is inserted into the DJ apparatus via a disc insertion opening. A round operation portion known as a jog dial is provided on an operation panel. When the jog dial is manually rotated by a user, various playback instructions such as playback and search are input.

In the rotational operation mechanism of a conventional jog dial, a sliding face known as a jog stay is fixed to the DJ apparatus body and a ring-shaped sliding member known as a jog ring is formed integrally with the jog dial and positioned so as to face the jog stay. When the user rotates the jog dial, the sliding face of the jog stay and the jog ring slide reciprocally, thereby enabling the jog dial to rotate.

In order to allow the jog dial to rotate smoothly, it is necessary to bias the jog ring in a vertical direction against the jog stay with an appropriate degree of force. If the biasing force is too strong, the friction generated between the jog ring and the jog stay is too great and rotation becomes difficult. If, on the other hand, the biasing force is too weak, then looseness occurs in the vertical direction and in the peripheral direction between the jog ring and the jog stay, and smooth operation becomes impossible. Therefore, in a conventional DJ apparatus, the jog ring is biased against the jog stay by employing a configuration in which the jog stay is vertically sandwiched between two jog rings using a combination of screws and springs.

In the above conventional configuration, however, since the jog ring is biased against the jog stay using the springs, it is necessary to employ a configuration in which both the top and bottom faces of the sliding face of the jog stay are sandwiched by two jog rings forming sliding members. As a result, the rotational operation mechanism becomes complicated, giving rise to the problem that the assembly process is quite complicated. In addition, there is such a tendency in rotational operation mechanisms utilizing a sliding member that the frictional resistance at the sliding face is relatively large, giving rise to the problem that smooth rotation cannot be obtained.

SUMMARY OF THE INVENTION

The present invention has been achieved in order to solve the above problems. It is an object of this invention to provide a rotational operation mechanism for a DJ apparatus that enables smooth rotation to be achieved using a simple configuration.

According to one aspect of the present invention, there is provided a rotational operation mechanism, including: a base member; a ring member that is positioned on the base member and that holds a plurality of rotatable balls; and an annularly shaped rotation operation portion positioned on the ring member and operated by an operator. Mutually facing surfaces of the base member and the rotation operation portion are provided with grooves that have substantially the same diameter as the ring member. The ring member is sandwiched between the base member and the rotation operation portion such that the plurality of balls of the ring member are received in the groove of the base member and the groove of the rotation operation portion and such that the ring member is rotatable in a peripheral direction. One of the rotation operation portion and the base member is provided with magnets and the other of the rotation operation portion and the base member is provided with metal portions at positions facing the magnets.

According to the above rotational operation mechanism, ring shaped grooves are provided in the base member and in the rotation operation portion, and the ring member is sandwiched between the base member and the rotation operation portion such that the plurality of balls are received between these grooves. Since the plurality of balls provided in the ring member are able to rotate, the rotation operation portion positioned on the ring member is rotated when operated by a user. In addition, magnets are provided in one of the rotation operation portion and the base member and metal portions are provided in the other of the rotation operation portion and the base member. The rotation operation portion is thus kept in a state of being biased towards the base member by an appropriate biasing force generated by the attraction force between the magnets and the metal portions. As a result, a smooth rotation is achieved by the rotation operation portion through this biasing force and the rotation of the balls on the ring member.

In the above rotational operation mechanism, the magnets may be provided equidistantly at a plurality of positions on the rotation operation portion or the base member, and these positions may also correspond to the circumference of the rotation operation portion. In an embodiment, the magnets may have a ring shape that corresponds to the circumference of the rotation operation portion. As a result, the biasing force between the base member and the rotation operation portion is made uniform over the circumference of the rotation operation portion, thereby enabling a smoother rotation to be achieved. Moreover, the magnets may be provided on either the rotation operation portion or the base member such that a gap is provided between the magnets and the metal portions.

In a preferred embodiment, a plurality of teeth may be formed continuously at positions on the circumference of the rotation operation portion, and the rotational operation mechanism may further be provided with a rotation detection unit for detecting a rotation of the rotation operation portion by counting the plurality of teeth. As a result, it becomes possible to accurately detect the rotation of the rotation operation portion.

The base member may be provided with a holding member that engages with a portion of the rotation operation portion and holds the rotation operation portion such that the rotation operation portion can be freely engaged and disengaged. As a result, the rotation operation portion can be easily removed and the replacement of the rotation operation portion is made possible.

The base member may include a base and an annular member fixed onto the base, and the groove may be formed on the annular member. As a result, after the groove is formed in the annular member, the base member can be easily manufactured by assembling the annular member together with the base.

According to another aspect of the present invention, there is provided a music playback apparatus including: a base member; a ring member that is positioned on the base member and holds a plurality of rotatable balls; an annularly shaped rotation operation portion positioned on the ring member and operated by an operator; a playback unit for playing back music discs; and a control unit for controlling playback of the playback unit in accordance with output from a rotation detection unit, wherein mutually facing surfaces of the base member and the rotation operation portion are provided with grooves that have substantially the same diameter as the ring member, the ring member is sandwiched between the base member and the rotation operation portion such that the plurality of balls of the ring member are received in the groove of the base member and the groove of the rotation operation portion so as to allow rotation of the ring member in a peripheral direction, one of the rotation operation portion and the base member is provided with magnets and the other of the rotation operation portion and the base member is provided with metal portions at positions facing the magnets, a plurality of teeth are formed continuously at positions on the circumference of the rotation operation portion, and the rotational operation mechanism is further provided with the rotation detection unit for detecting a rotation of the rotation operation portion by counting the plurality of teeth. According to this music playback apparatus, the rotation of the rotation operation portion is detected and the playback of the music disc is controlled in accordance with the result of the detection.

According to still another aspect of the present invention, there is provided a music playback apparatus including: a base member; a ring member that is positioned on the base member and holds a plurality of rotatable balls; an annularly shaped rotation operation portion positioned on the ring member and operated by an operator; a playback unit for playing back music discs; and a display section provided in a center portion of the annular member, wherein mutually facing surfaces of the base member and the rotation operation portion are provided with grooves that have substantially the same diameter as the ring member, the ring member is sandwiched between the base member and the rotation operation portion such that the plurality of balls of the ring member are received in the groove of the base member and the groove of the rotation operation portion so as to allow rotation of the ring member in a peripheral direction, one of the rotation operation portion and the base member is provided with magnets and the other of the rotation operation portion and the base member is provided with metal portions at positions facing the magnets, the base member includes a base and an annular member fixed onto the base, and the groove is formed on the annular member. As a result, a user is able to operate the rotation operation portion while viewing information displayed on the display section.

According to still another aspect of the present invention, there is provided a music playback apparatus including: a base member; a ring member that is positioned on the base member and holds a plurality of rotatable balls; an annularly shaped rotation operation portion positioned on the ring member and operated by an operator; a playback unit for playing back music discs; and an operating switch member provided in a center portion of the annular member, wherein mutually facing surfaces of the base member and the rotation operation portion are provided with grooves that have substantially the same diameter as the ring member, the ring member is sandwiched between the base member and the rotation operation portion such that the plurality of balls of the ring member are received in the groove of the base member and the groove of the rotation operation portion so as to allow rotation of the ring member in a peripheral direction, and one of the rotation operation portion and the base member is provided with magnets and the other of the rotation operation portion and the base member is provided with metal portions at positions facing the magnets, the base member includes a base and an annular member fixed onto the base, and the groove is formed on the annular member. As a result, the user is able to simultaneously operate, with ease, the rotational operation mechanism and the operating switch member located at the center of the rotational operation mechanism.

DESCRIPTION OF THE PREFERRED EMBODIMENTS

Preferred embodiments of the present invention will now be described with reference to the attached drawings.

Figure 1A:
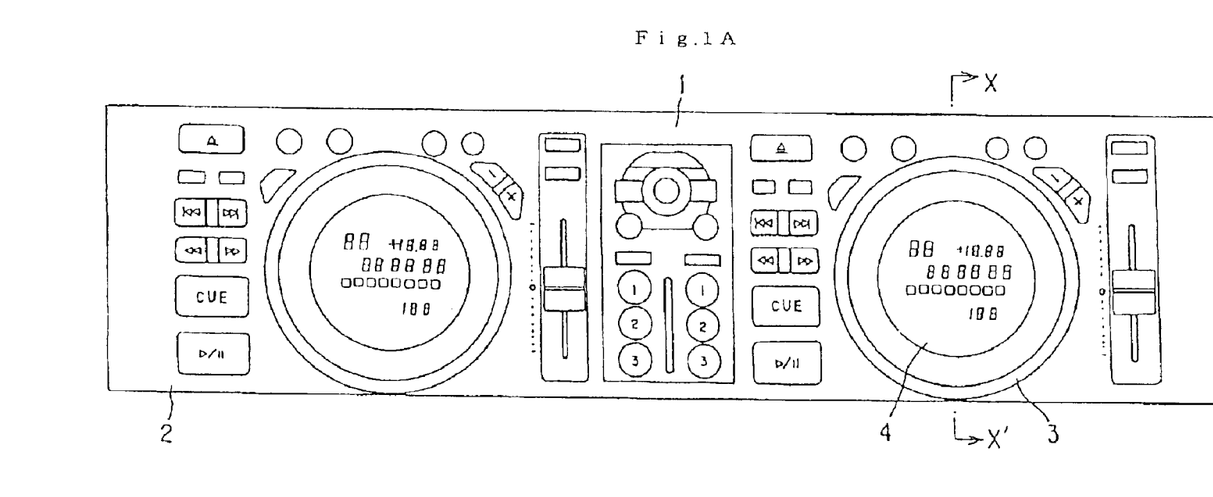
FIGS. 1A and 1B are views showing an exterior of a DJ apparatus according to an embodiment of the present invention.
Figure 1B:
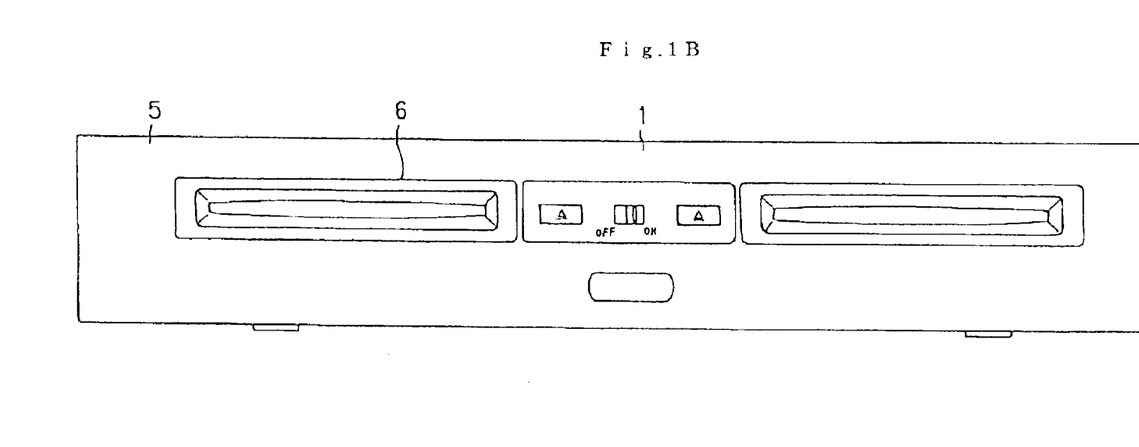

The exterior of the DJ apparatus according to the present invention is shown in FIGS. 1A and 1B. The DJ apparatus 1 is formed as a case substantially in the shape of a rectangular parallelepiped. FIG. 1A shows an operation panel 2 formed at the top face of the DJ apparatus 1, while FIG. 1B shows a front face panel 5 formed at a side face of the DJ apparatus 1.

A pair of disc insertion openings 6 are provided at the front face panel 5, and music discs such as CDs are inserted into each disc insertion opening 6. The operation panel 2 is made of metal, and various switches and buttons for controlling playback of the music disc are provided on the operation panel 2. A pair of jog dials 3 are also provided at the left and right area of the operation panel 2. Playback of the music disc is controlled by a user rotating a jog dial 3 in a clockwise direction or a counterclockwise direction. Each jog dial 3 is formed as an annular rotation operation member with a display section 4 provided inside the ring thereof. Information such as the track number, playback time and playback tempo of the music disc is displayed on the display section 4. The display section 4 is formed by a transparent display window member (described below) and a display panel positioned under the display window member.

Figure 2A:
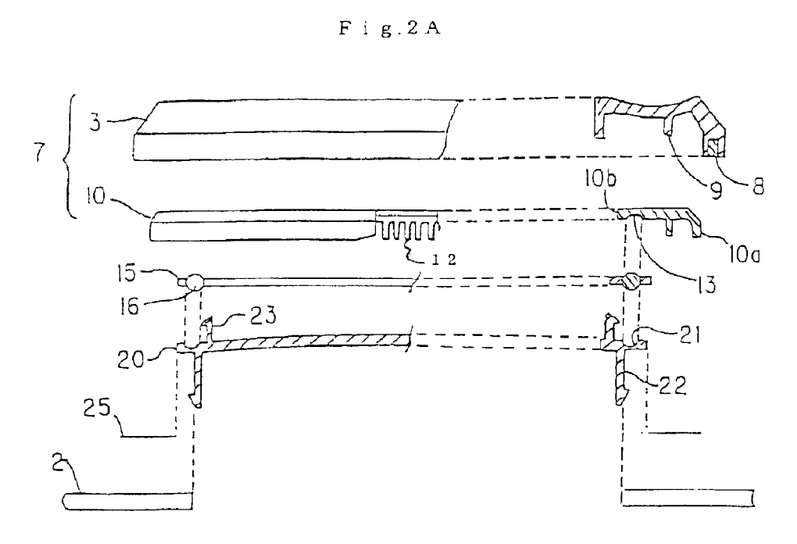
FIGS. 2A and 2B are views showing the rotational operation mechanism of the DJ apparatus shown in FIGS. 1A and 1B.
Figure 2B:
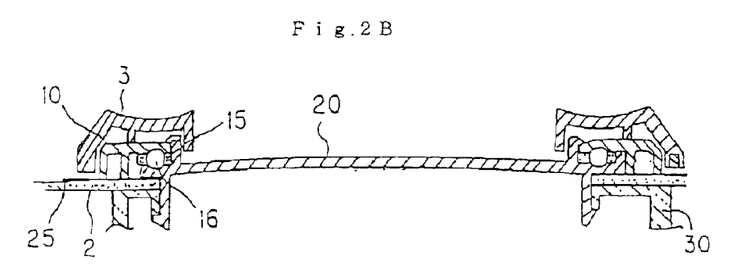
Figure 3A:
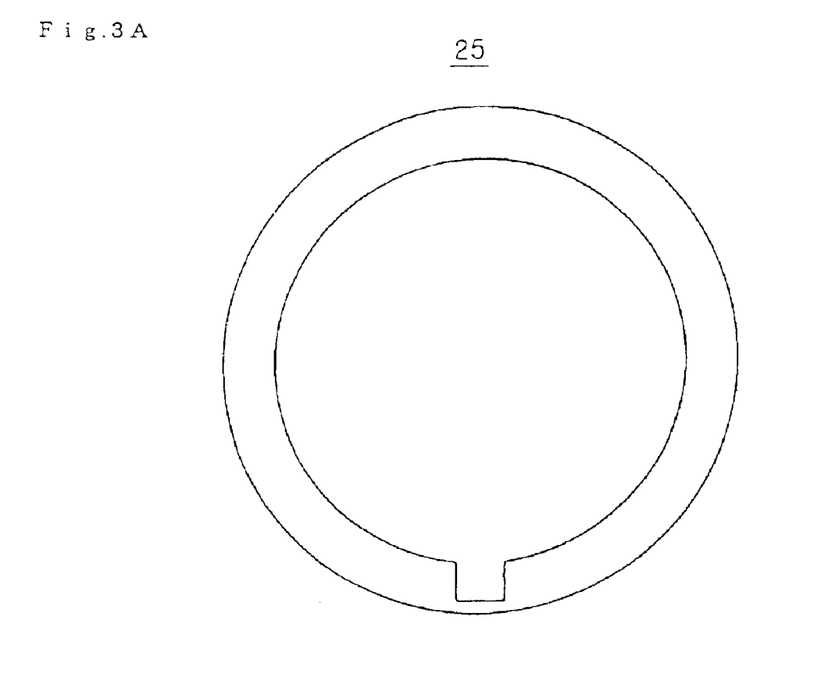
FIGS. 3A and 3B are views showing members forming the rotational operation mechanism shown in FIGS. 2A and 2B.

FIGS. 2A and 2B show the jog dial rotational operation mechanism. FIG. 2A is an exploded view of the jog dial rotational operation mechanism, while FIG. 2B is a cross sectional view in the diametral direction of the jog dial rotational operation mechanism taken along the line X–X' in FIG. 1A. Round holes are formed on the operation panel 2 shown in FIG. 1A at the position of the jog dials 3. The respective members shown in FIG. 2A are mounted in the sequence shown on the hole portion so as to form the jog dial rotational operation mechanism. Firstly, a jog sheet 25 is adhered by double-sided tape or the like on the top surface of the operation panel 2. The planar configuration of the jog sheet 25 is shown in FIG. 3A.

Figure 3B:
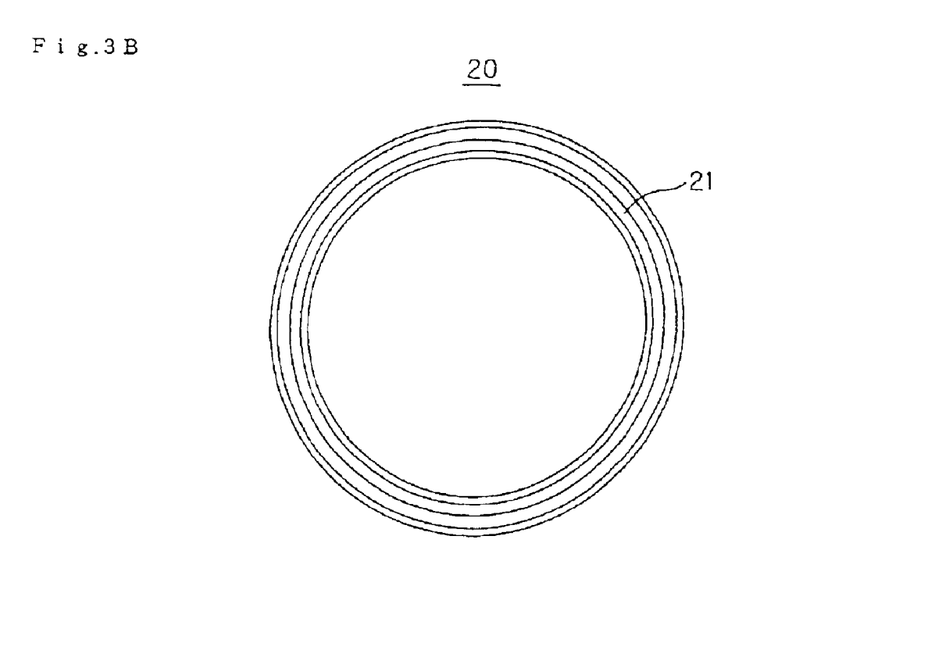

An annular display window member 20 is provided at the inner side of the inner diameter of the jog sheet 25. The planar configuration of the display window member 20 is shown in FIG. 3B. As shown, a circumferential groove 21 is provided on the top of the display window member 20. In addition, claws 22 are provided in the lower face as seen in FIG. 2A of the display window member 20 and, as is shown in FIG. 2B, the claws 22 engage with a support member 30 provided below the operation panel 2 thereby fixing the display window member 20 to the operation panel 2. Claws 23 are also provided at the upper face as seen in FIG. 2A of the display window member 20. As previously mentioned, the center portion of the display window member 20 is transparent, and the display panel located below this center portion can be seen by a user from above the operation panel.

Figure 4A:
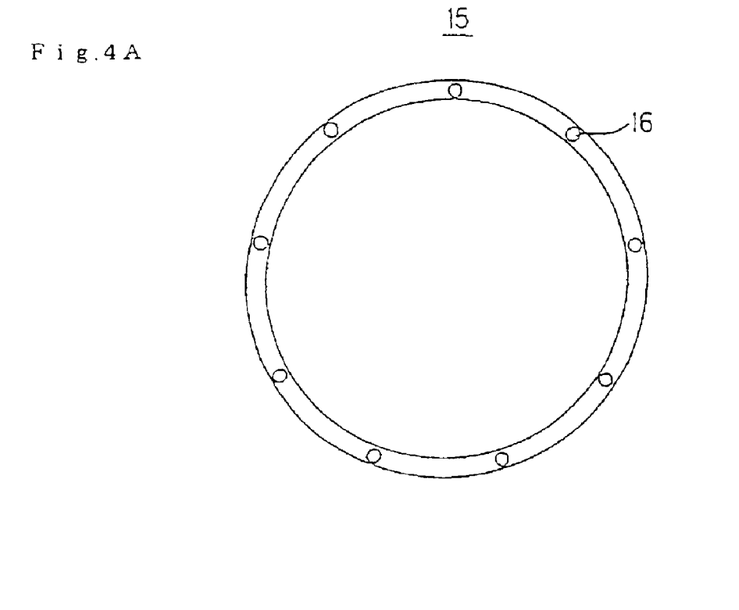
FIGS. 4A and 4B are other views showing members forming the rotational operation mechanism shown in FIGS. 2A and 2B.

A retainer 15 is provided above the display window member 20. The retainer 15 is a ring shaped member, such as that shown in FIG. 4A, and has a plurality of rotatable steel balls 16 spaced equidistantly in the circumferential direction. The shape and diameter of the retainer 15 substantially match the groove 21 provided in the display window member 20, and the retainer 15 is placed on the display window member 20 such that the steel balls 16 are received by the groove 21 of the display window member 20. Since the steel balls 16 are rotatable, the retainer 15 itself is able to rotate on the groove 21 of the display window member 20. It is to be understood that the number of steel balls 16 provided on the retainer 15 is not limited to the number shown in the drawings.

Figure 5:
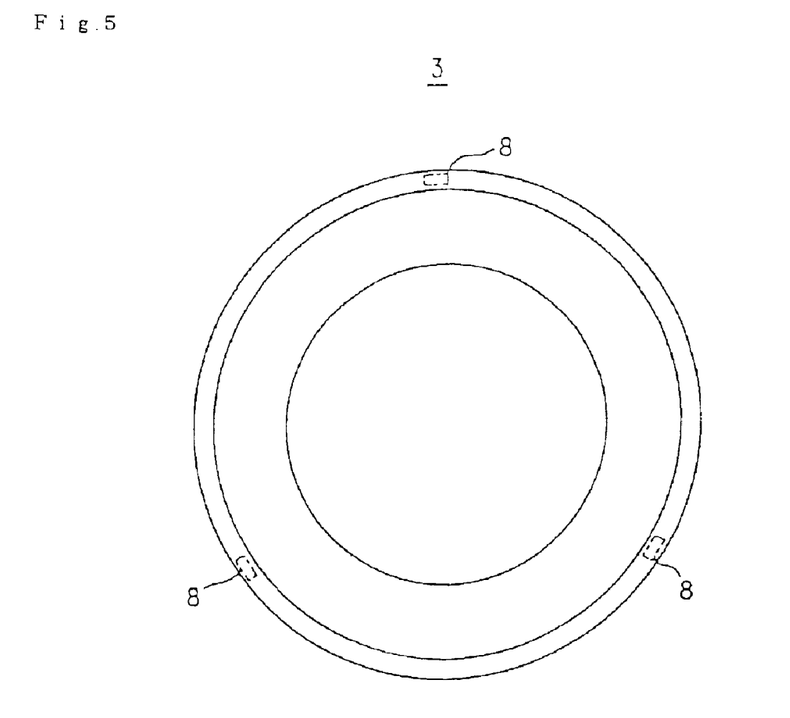
FIG. 5 is another view showing members forming the rotational operation mechanism shown in FIGS. 2A and 2B.
Figure 6A:
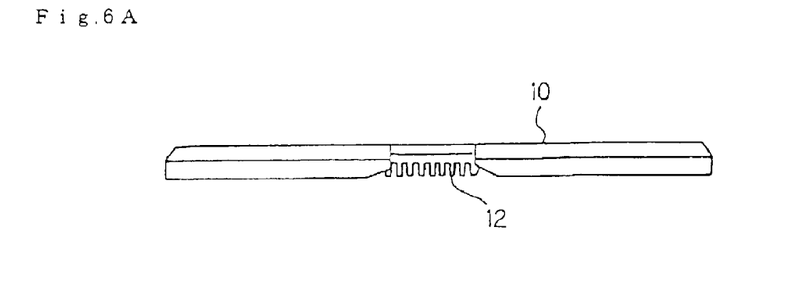
FIGS. 6A and 6B are views schematically showing the rotation detection mechanism of the DJ apparatus shown in FIG. 1.
Figure 6B:
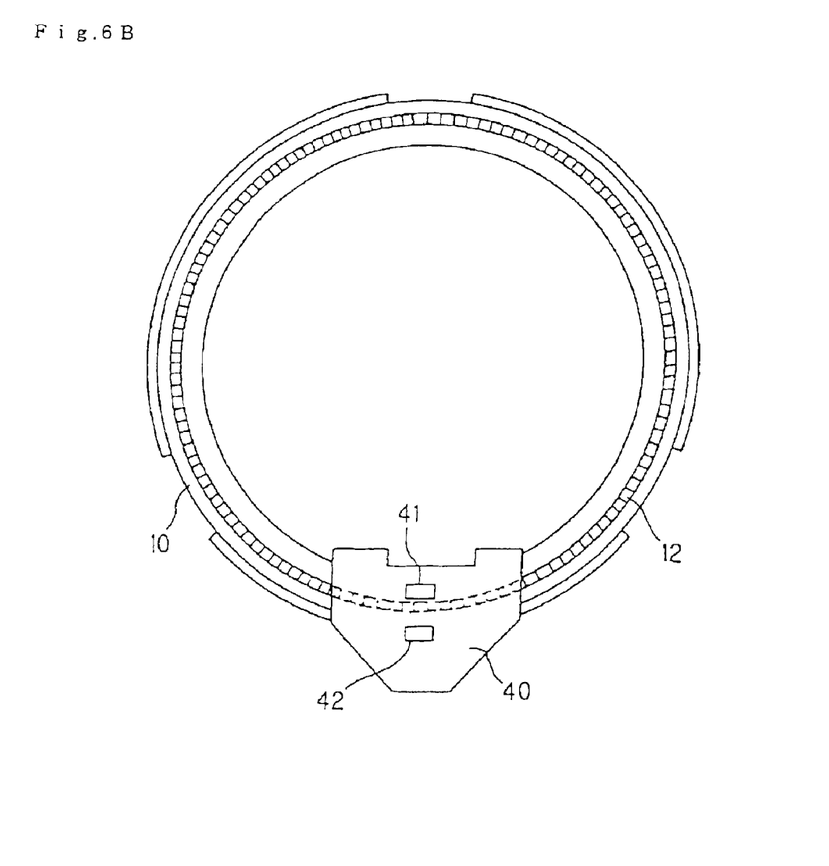

The jog ring 10 and the jog dial 3 are placed integrally with each other on the retainer 15. Note that the member formed when the jog ring 10 is made integral with the jog dial 3 may on occasion be referred to as "jog 7". The planar configuration of the jog ring 10, which is seen from the bottom side thereof in FIG. 2A, is shown in FIG. 6B, while the planar configuration of the jog dial 3, which is seen from the top side thereof in FIG. 2A, is shown in FIG. 5. Teeth 12 that are used for detecting the rotation at the circumference are provided on the lower face as seen in FIG. 2 of the jog ring 10. The bottommost portions of the teeth 12 locate above the bottommost portion of the outer peripheral end portion 10a of the jog ring 10. Namely, the teeth 12 are formed such that they are not damaged if the jog ring 10 is placed by itself on a workbench or the like during the assembly of the rotational operation mechanism. The rotation detection mechanism will be described later.

A circumferential groove 13 is also provided at the lower face as seen in FIG. 2A of the jog ring 10. The shape of the groove 13 substantially matches the ring shape of the retainer 15 and when the jog ring 10 is placed on the retainer 15, the groove 13 receives the plurality steel balls 16 provided on the retainer 15. As a result, the retainer 15 is sandwiched between the display window member 20 and the jog ring 10, and the retainer 15 is able to rotate due to the steel balls 16 moving in the ring shaped passage formed by the groove 13 of the jog ring 10 and the groove 21 of the display window member 20.

Figure 4B:
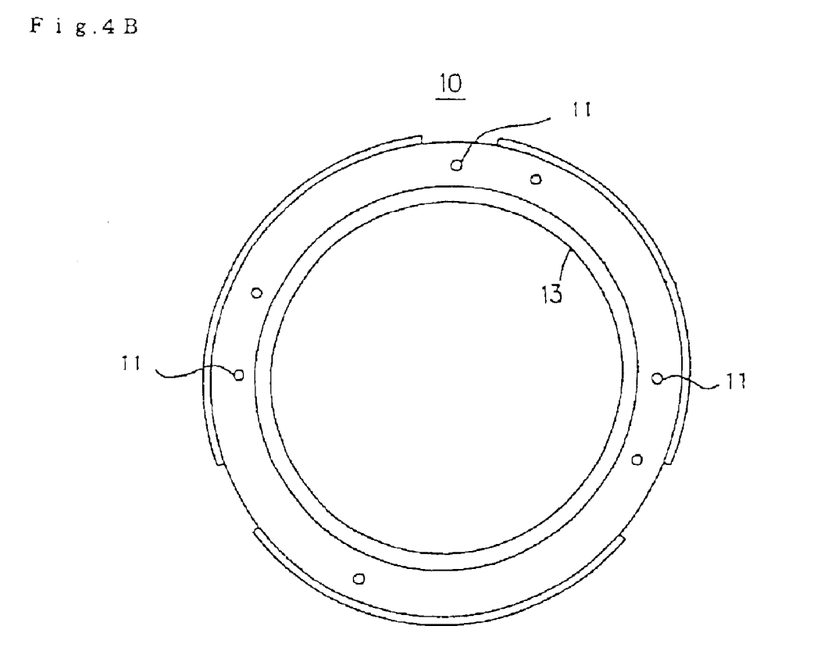

Protrusions 9 are provided at a plurality of locations on the circumference of the jog dial 3. The jog dial 3 is made integral with the jog ring 10 by these protrusions 9 being fitted inside the holes 11 (see. FIG. 4B) formed on the jog ring 10. As is shown in FIG. 2A and FIG. 5, a plurality of magnets 8 are embedded in the outer peripheral end portion of the jog dial 3. As a result of the attraction force generated between the magnets 8 and the metal operation panel 2, the magnets 8 bias the jog 7 toward the operation panel 2. However, a gap is provided between the magnets 8 and the operation panel 2 so that they do not come into contact with each other. As a result of the biasing force of the magnets 8, the jog ring 10 is biased towards the display window member 20 with an appropriate degree of force. The number of magnets provided in the jog dial 3 is not limited to the number shown in the drawings. However, in order to enable the jog 7 to rotate smoothly, it is desirable that a plurality of magnets be disposed equidistantly on the circumference of the jog dial 3. This allows the biasing force of the jog 7 towards the display window member 20 to be distributed uniformly around the circumference of the jog 7. Alternatively, in order to distribute the biasing force of the jog 7 towards the display window member 20 even more uniformly, it is desirable that a ring shaped magnet be embedded in the outer periphery of the jog dial 3. This results in the attraction force generated by the magnet between the operation panel 2 and the jog 7 being distributed evenly across all points on the outer periphery of the jog 7, and allows the rotation of the jog 7 to be made even smoother. Because the biasing force between the jog 7 and the display window member 20 is generated in this way by the magnets 8, it is possible to bias the jog 7, which forms a rotating portion, towards the operation panel 2, which forms a fixed portion, without the two coming into contact with each other.

As is shown in FIG. 2A, an inner peripheral end portion 10b of the jog ring 10 is held under the claws 23 formed on the upper face of the display window member 20. This prevents the jog 7 from detaching in the upward direction as seen in FIG. 2A if the DJ apparatus 1 is made upside down or the like. It is to be understood that the biasing force biasing the jog 7 towards the display window member 20 is fully supplied by the magnets 8, therefore, it is not necessary for the claws 23 of the display window member 20 to have any action biasing the jog 7 downwards and it is sufficient if the jog 7 is prevented from being slipped off.

By employing this configuration, the jog 7 can be easily removed and reattached. Namely, since the jog 7 is attached to the operation panel 2 by the engagement between the claws 23 of the display window member 20 and the inner peripheral end portion 10b of the jog ring 10, and by the attraction force generated between the magnets 8 in the jog dial 3 and the operation panel 2, by forming the claws 23 of the display window member 20 with the appropriate hardness, it is possible for the jog 7 to be easily removed from and reattached to the display window member 20. Therefore, it is possible for a variety of types of jog dial 3 having different external configurations and colors to be used with the same DJ apparatus 1 if the configuration of the engagement thereof with the jog ring 10 is made the same, thereby enabling a user to employ the user's favorite jog dial.

Next, the rotation detection mechanism will be described with referring to FIGS. 6A and 6B. FIG. 6A is a side view of the jog ring 10, while FIG. 6B is a plan view typically showing the rotation detection mechanism. Referring to FIG. 6B, the rotation detection unit 40 is a type of mechanism that optically detects the passage of the teeth 12 provided on the jog ring 10, and is provided with a light emitting unit 41 and a light receiving unit 42. The light emitting unit 41 and the light receiving unit 42 are positioned at the same height as the teeth 12. When a user rotates the jog 7, the teeth 12 pass between the light emitting unit 41 and the light receiving unit 42, and the light traveling from the light emitting unit 41 to the light receiving unit 42 is interrupted. By converting the light reception state in the light receiving unit 42 into an electrical signal, the rotation of the jog 7 can be detected. The electrical signals thus obtained are sent to an electrical control system (not shown) and are used as instruction input signals for the playback of a music disc. In the present embodiment, an optical rotation detection mechanism is used in the example, however, it is to be understood that various other known rotation detection mechanisms can be employed instead of this.

Moreover, in the above described embodiment, a configuration is employed in which the operation panel is made of metal and the magnets are disposed on the jog side. However, instead of this, it is also possible to employ a configuration in which the magnets are disposed on the operation panel side and metal is provided on the jog side so as to generate an attraction force between them.

Furthermore, in the above example, the display window member is attached to the operation panel. However, instead of this, it is also possible to fix an annular member having an annular groove but not having a display window member onto the operation panel, and to provide a display window member on the rotation operation portion side facing this annular member. It is also possible to form an annular groove on the operation panel itself and incorporate this with a rotation operation portion having a display window member.

Moreover, in the above example, a display section is provided at the center portion of the jog dial. However, instead of this, it is also possible to provide an operating switch member in which a plurality of operating switches are formed at the center portion of the jog dial.

As has been described above, according to the rotational operation mechanism of the present invention, since a biasing force biasing the jog dial towards the operation panel is generated by magnets, it is possible to bias the jog without making the jog come into contact with the operation panel. In addition, because the rolling action of steel balls is used for rotation, no sliding resistance is generated, and a jog that has remarkably smooth rotation can be achieved.

Furthermore, since the removal or reattachment of the jog only needs to be performed from the upper side of the operation panel and is thus a simple operation, the configuration may be simplified and the assembly process may be streamlined. In addition, it is possible for a user to easily switch between various types of jog in accordance with the user's preferences.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning and range of equivalency of the claims are therefore intended to embraced therein.

The entire disclosure of Japanese Patent Applications No. 2001-148442 filed on May 17, 2001 including the specification, claims, drawings and summary is incorporated herein by reference in its entirety.

What is claimed is:

1. A rotational operation mechanism, comprising:

a base member;

a ring member that is positioned on the base member and holds a plurality of rotatable balls; and an annularly shaped rotation operation portion positioned on the ring member and operated by an operator, wherein mutually facing surfaces of the base member and the rotation operation portion are provided with grooves that have substantially the same diameter as the ring member, the ring member is sandwiched between the base member and the rotation operation portion such that the plurality of balls of the ring member are received in the groove of the base member and the groove of the rotation operation portion so as to allow rotation of the ring member, and one of the rotation operation portion and the base member is provided with magnets and the other of the rotation operation portion and the base member is provided with metal portions at positions facing the magnets.

2. The rotational operation mechanism according to claim 1, wherein the magnets are provided equidistantly at a plurality of positions on the rotation operation portion or the base member, and the plurality of positions correspond to the circumference of the rotation operation portion.

3. The rotational operation mechanism according to claim 2, wherein the magnets are provided on either the rotation operation portion or the base member such that a gap is provided between the magnets and the metal portions.

4. The rotational operation mechanism according to claim 1, wherein the magnets have a ring shape that corresponds to the circumference of the rotation operation portion.

5. The rotational operation mechanism according to claim 1, wherein a plurality of teeth are formed continuously at positions on the circumference of the rotation operation portion, and the rotational operation mechanism is further provided with a rotation detection unit for detecting a rotation of the rotation operation portion by counting the plurality of teeth.

6. The rotational operation mechanism according to claim 1, wherein the base member is provided with a holding member that engages with a portion of the rotation operation portion and holds the rotation operation portion such that the rotation operation portion can be freely engaged and disengaged.

7. The rotational operation mechanism according to claim 1, wherein the base member includes a base and an annular member fixed onto the base, and wherein the groove is formed on the annular member.

8. The rotational operation mechanism according to claim 1, wherein the magnets and the metal portions face each other with a gap therebetween.

9. The rotational operation mechanism according to claim 1, wherein the magnets and the metal portions face without contacting each other.

10. A music playback apparatus comprising:

a base member;

a ring member that is positioned on the base member and holds a plurality of rotatable balls;

an annularly shaped rotation operation portion positioned on the ring member and operated by an operator;

a playback unit for playing back music discs; and a control unit for controlling playback of the playback unit in accordance with output from a rotation detection unit, wherein mutually facing surfaces of the base member and the rotation operation portion are provided with grooves that have substantially the same diameter as the ring member, the ring member is sandwiched between the base member and the rotation operation portion such that the plurality of balls of the ring member are received in the groove of the base member and the groove of the rotation operation portion so as to allow rotation of the ring member, one of the rotation operation portion and the base member is provided with magnets and the other of the rotation operation portion and the base member is provided with metal portions at positions facing the magnets, a plurality of teeth are formed continuously at positions on the circumference of the rotation operation portion, and the rotational operation mechanism is further provided with the rotation detection unit for detecting a rotation of the rotation operation portion by counting the plurality of teeth.

11. The music playback apparatus according to claim 10, wherein the magnets and the metal portions face each other with a gap therebetween.

12. The music playback apparatus according to claim 10, wherein the magnets and the metal portions face without contacting each other.

13. A music playback apparatus comprising:

a base member;

a ring member that is positioned on the base member and holds a plurality of rotatable balls;

an annularly shaped rotation operation portion positioned on the ring member and operated by an operator;

a playback unit for playing back music discs; and a display section provided in a center portion of the annular member, wherein mutually facing surfaces of the base member and the rotation operation portion are provided with grooves that have substantially the same diameter as the ring member, the ring member is sandwiched between the base member and the rotation operation portion such that the plurality of balls of the ring member are received in the groove of the base member and the groove of the rotation operation portion so as to allow rotation of the ring member, one of the rotation operation portion and the base member is provided with magnets and the other of the rotation operation portion and the base member is provided with metal portions at positions facing the magnets, the base member includes a base and an annular member fixed onto the base, and the groove is formed on the annular member.

14. The music playback apparatus according to claim 13, wherein the magnets and the metal portions face each other with a gap therebetween.

15. The music playback apparatus according to claim 13, wherein the magnets and the metal portions face without contacting each other.

16. A music playback apparatus comprising:

a base member;

a ring member that is positioned on the base member and holds a plurality of rotatable balls;

an annularly shaped rotation operation portion positioned on the ring member and operated by an operator;

a playback unit for playing back music discs; and an operating switch member provided in a center portion of the annular member, wherein mutually facing surfaces of the base member and the rotation operation portion are provided with grooves that have substantially the same diameter as the ring member, the ring member is sandwiched between the base member and the rotation operation portion such that the plurality of balls of the ring member are received in the groove of the base member and the groove of the rotation operation portion so as to allow rotation of the ring member, and one of the rotation operation portion and the base member is provided with magnets and the other of the rotation operation portion and the base member is provided with metal portions at positions facing the magnets, the base member includes a base and an annular member fixed onto the base, and the groove is formed on the annular member.

17. The music playback apparatus according to claim 16, wherein the magnets and the metal portions face each other with a gap therebetween.

18. The music playback apparatus according to claim 16, wherein the magnets and the metal portions face without contacting each other.

19. A rotational operation mechanism comprising:

a base member;

a ring member holding a plurality of rotatable balls; and a rotation operation member configured for operation by an operator, wherein the base member and the rotation operation member each comprise a substantially circumferential groove, wherein the ring member is disposed between the base member and the rotation operation member such that the rotatable balls are movably received in a passage formed by the groove of the base member and the groove of the rotation operation member, and wherein one of the base member and the rotation operation member is provided with one or more magnets and the other of the base member and the rotation operation member is provided with metal that faces the magnets to thereby provide a biasing force therebetween.

20. A music playback apparatus comprising a rotational operation mechanism according to claim 19.

21. The music playback apparatus according to claim 20, further comprising:

a rotation detector for detecting rotation of the rotation operation member.

22. The music playback apparatus according to claim 20, further comprising:

a display arranged in an opening formed in the rotation operation member.

23. The music playback apparatus according to claim 20, further comprising:

one or more operator controls arranged in an opening formed in the rotation operation member.

24. The music playback apparatus according to claim 20, wherein the base member comprises an engagement mechanism for engaging the base member to the rotation operation member with the ring member therebetween.

25. The music playback apparatus according to claim 20, wherein the base member comprises a base and an annular member attached to the base, and wherein the groove of the base member is formed in the annular member thereof.

* * * * *